United States Patent
Jones et al.

(10) Patent No.: US 6,260,924 B1
(45) Date of Patent: Jul. 17, 2001

(54) MODULAR SEAT BACK SYSTEM

(75) Inventors: William H. Jones, Rochester; Kevin E. Briggs, Livonia; Benny T. Vo, Canton, all of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/372,723

(22) Filed: Aug. 11, 1999

(51) Int. Cl.[7] ........................................ A47C 7/02
(52) U.S. Cl. ........................ 297/452.18; 297/248
(58) Field of Search ................ 297/452.18, 378.12, 297/483, 248, 284.1, 440.14

(56) References Cited

U.S. PATENT DOCUMENTS

| | | |
|---|---|---|
| 4,246,734 | 1/1981 | Fogle, Jr. et al. . |
| 4,493,505 | 1/1985 | Yamawaki et al. . |
| 5,273,336 | 12/1993 | Schubring et al. . |
| 5,507,555 * | 4/1996 | Kiguchi . |
| 5,529,376 * | 6/1996 | Jovan et al. . |
| 5,547,259 | 8/1996 | Fredrick . |
| 5,597,139 * | 1/1997 | Beroth . |
| 5,671,976 | 9/1997 | Fredrick . |
| 5,676,423 | 10/1997 | Pedronno . |
| 5,716,100 | 2/1998 | Lang . |
| 5,826,945 | 10/1998 | Siebler et al. . |

* cited by examiner

Primary Examiner—Milton Nelson, Jr.
(74) Attorney, Agent, or Firm—Foley & Lardner

(57) ABSTRACT

A modular seat back system for a vehicle, including a type-A seat back frame having a center shoulder seatbelt anchorage, and a type-B seat back frame having a smaller width. The left edges of the seat back frames are substantially similar in shape and size, and the right edges of the seat back frames are substantially similar in shape and size. The symmetry between the edges allows the modular seat back system to form a "40/40 configuration" with two type-B seat back frames in smaller vehicles, a "40/60 configuration" with one type-A and one type-B seat back frame in medium-sized vehicles, and a "60/60 configuration" with two type-A seat back frames in larger vehicles. Further, the dual-nature of the center seatbelt anchorage allows the modular seat back system to form a "40/60 configuration" in left-hand-drive versions of a particular vehicle line, and a "60/40 configuration" for the right-hand-drive versions.

19 Claims, 6 Drawing Sheets

MODULAR SEAT BACK SYSTEM

TECHNICAL FIELD OF THE INVENTION

This invention generally relates to seating systems for a vehicle and, more particularly, to modular seat back systems and methods for supplying such systems to different vehicle lines, and to both left-hand-drive and right-hand-drive versions of a vehicle.

BACKGROUND

Typically, an automotive manufacturer has three or more different vehicle lines or platforms which are used to produce their product lines. For example, a smaller vehicle platform, a medium-sized vehicle platform, and a larger vehicle platform would typically cover the passenger car segments of the manufactures product lines. These platforms often have different wheelbases (the distance between the axles of the vehicle) and different tracks (the distance between the wheels on a particular axle). The rear track of a vehicle is one of the key factors that determine the available width of a rear seating system. The fact that an automotive manufacturer sells vehicles of different sizes often dictates that the automotive manufacturer produce rear seating systems with different widths.

Using the conventional techniques in the art, rear seating system manufacturers have supplied different and unique rear seating systems for each of these different sized vehicles. In their effort, these manufacturers have encountered the enormous cost associated with engineering, tooling, manufacturing, and validating separate seating systems. There exists a tremendous desire to reduce or eliminate many or all of these costs in a continuing effort to reduce the overall cost of producing a vehicle.

SUMMARY OF THE INVENTION

Accordingly, this invention provides for a modular seat back system that overcomes the problems and disadvantages of the conventional techniques in the art. The present invention also provides for a modular seat back system that avoids or reduces the costs associated with engineering, tooling, manufacturing, and validating separate seat back systems for vehicle architectures of different available widths.

Briefly, the modular seat back system of the present invention includes a type-A seat back frame having a center shoulder seatbelt anchorage, and a type-B seat back frame having a width less than the width of the type-A seat back frame. The left edges of the type-A and type-B seat back frames are substantially similar in shape and size, and the right edges of the type-A and type-B seat back frames are substantially similar in shape and size. The symmetry between the edges allows the modular seat back system to form a "40/40 configuration" with two type-B seat back frames in smaller vehicles, a "40/60 configuration" with one type-A and one type-B seat back frame in medium-sized vehicles, and a "60/60 configuration" with two type-A seat back frames in larger vehicles. Further, the dual-nature of the center shoulder seatbelt anchorage allows the modular seat back system to form a "40/60 configuration" in left-hand-drive versions of a particular vehicle line, and a "60/40 configuration" for the right-hand-drive versions.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENT

The following description of the preferred embodiment is merely exemplary in nature, and is in no way intended to limit the invention, its application, or uses.

Figure 1:
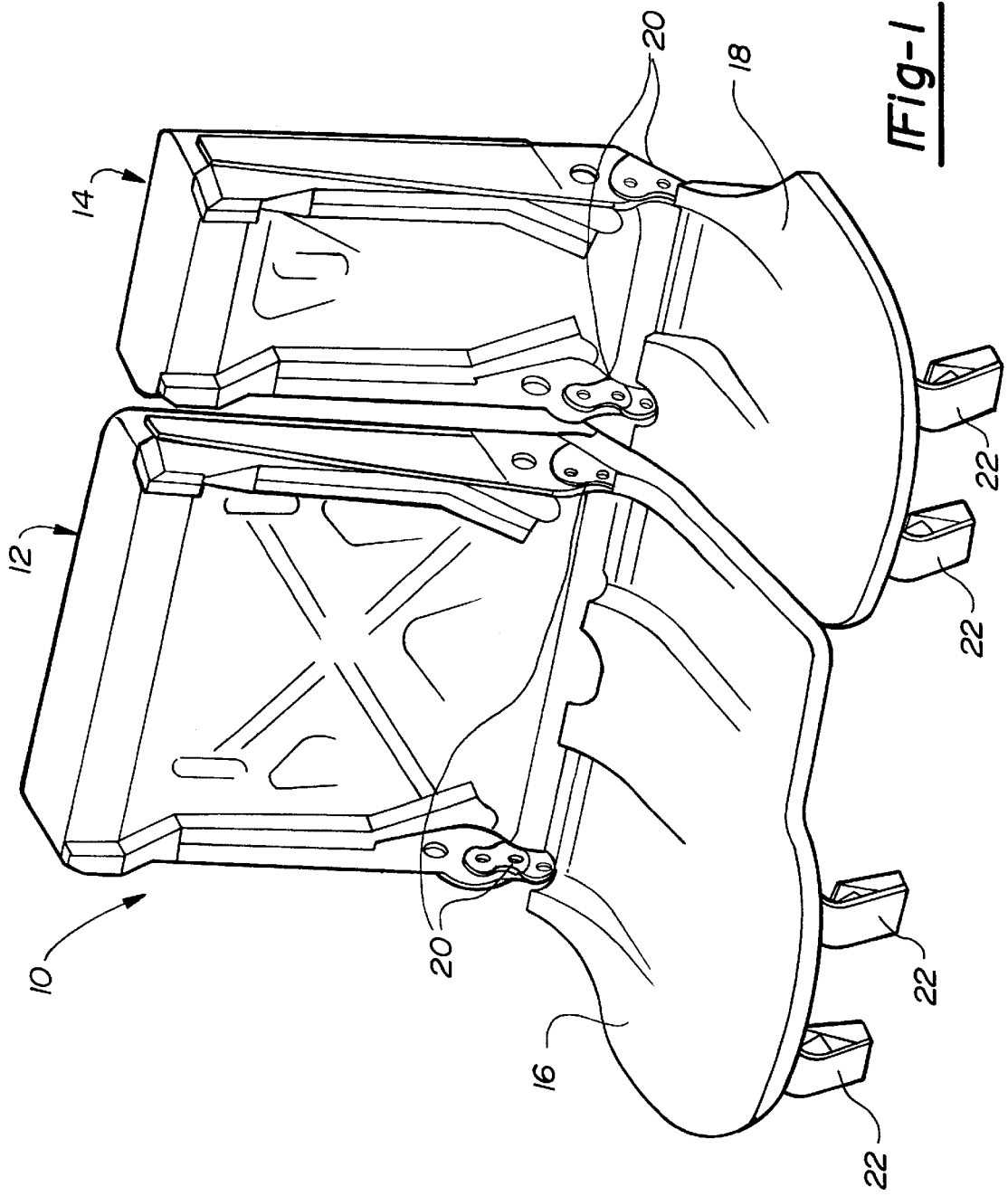
FIG. 1 is a perspective view of two seat cushion frames and a modular seat back system according to the present invention.

As shown in FIG. 1, the modular seat back system 10 of the present invention includes a combination of a type-A seat back frame 12 and a type-B seat back frame 14. The seat back frames 12 and 14 are secured to the vehicle (not shown) by the hinge brackets 20 and are located near the seat cushion frames 16 and 18, which are secured to the vehicle with hinge brackets 22. The seat back frames 12 and 14 are typically used with seat coverings (not shown) made from cloth, leather, or other fabrics. Because seat cushion frames, hinge brackets, and seat coverings are all known and used in the art of seat systems, the following detailed discussion focuses primarily on the seat back frames 12 and 14.

Figure 2:
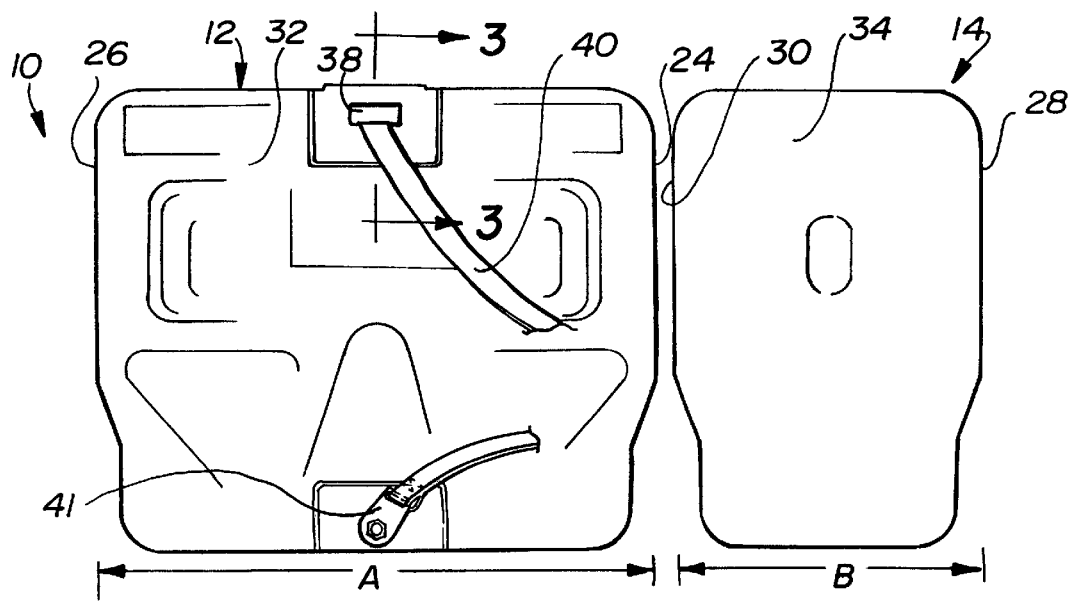
FIG. 2 is a front view of the modular seat back system in a "40/60 configuration"

As shown in FIG. 2, the type-A seat back frame 12 has a left edge 24 and a right edge 26, and the type-B seat back frame 14 has a left edge 28 and a right edge 30. In the preferred embodiment of the present invention, the left edge 24 of the type-A seat back frame 12 and the left edge 28 of the type-B seat back frame 14 are substantially similar in shape and size. Further, the right edge 26 of the type-A seat back frame 12 and the right edge 30 of the type-B seat back frame 14 are also substantially similar in shape and size. In the preferred embodiment, the left edges 24 and 28 are symmetrically opposite the right edges 26 and 30. In other words, the right edges 26 and 30 are "mirror-images" of the left edges 24 and 28. The symmetry between the edges promotes the modular features of the modular seat back system 10, as further explained below.

In the preferred embodiment, the type-A seat back frame 12 provides for two seating positions, while the type-B seat back frame 14 provides for only one seating position. The type-A seat back frame 12 has a width A and the type-B seat back frame 14 has a width B, as measured in an upper portions 32 and 34 of the seat back frames 12 and 14 between the left edges 24 and 28 and the right edges 26 and 30, respectively. Because the type-A seat back frame provides for twice as many seating positions as the type-B seat back frame, the width A is typically between 1.5 and 2.5 times greater than the width B.

The type-A seat back frame 12 is sometimes referred to as the "60" seat back frame representing approximately 60% of the total width of the modular seat back system 10, and the type-B seat back frame 14 as the "40" seat back frame representing approximately 40% of the total width. Accordingly, throughout this description, the use of the terms "40/60 configuration" and "60/40 configuration" refers to a combination of a type-A seat back frame 12 and a type-B seat back frame 14. Likewise, the use of the terms "60/60 configuration" and "40/40 configuration" throughout this description refers to a pair of type-A seat back frames 12 and a pair of type-B seat back frames 14, respectively.

Figure 3:
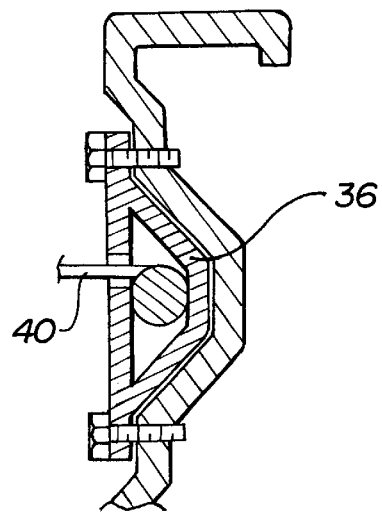
FIG. 3 is a cross-sectional view taken along the lines 3—3 in FIG. 2.
Figure 3:
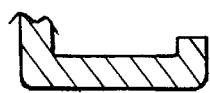

As shown in FIGS. 2 and 3, the type-A seat back frame 12 preferably includes a seatbelt retraction device 36 acting as a center shoulder seatbelt anchorage 38 in the upper portion 32 of the type-A seat back frame 12. The seatbelt retraction device 36 spools a seatbelt or webbing 40 for convenient use or storage when not in use by the occupant of the vehicle. The free end of the seatbelt 40 may pass through a buckle (not shown) secured to the vehicle and may attach to a pelvic seatbelt anchorage 41 on the vehicle for either the left side seating position or the right side seating position within type-A seat back frame 12. Alternatively, the pelvic seatbelt anchorage 41 may be secured to the vehicle. This dual-nature of the center shoulder seatbelt anchorage 38 of the type-A seat back frame 12 promotes the modular features of the modular seat back system 10, as further explained below.

The term "seatbelt anchorage" means any component, other than the seatbelt or webbing, involved in transferring seatbelt loads to the vehicle structure, as defined by the National Highway Traffic Safety Administration, Department of Transportation in 49 CFR § 571.210 (10-1-96 Edition). Seatbelt anchorages would include, for example, components such as brackets sewn to the end of a seatbelt and secured to the vehicle structure or intermediary component, retractors (wound, linear, or other style) secured to the vehicle structure or intermediary components, and reinforcement brackets or doubler plates used in the energy distribution during loading.

Figure 4:
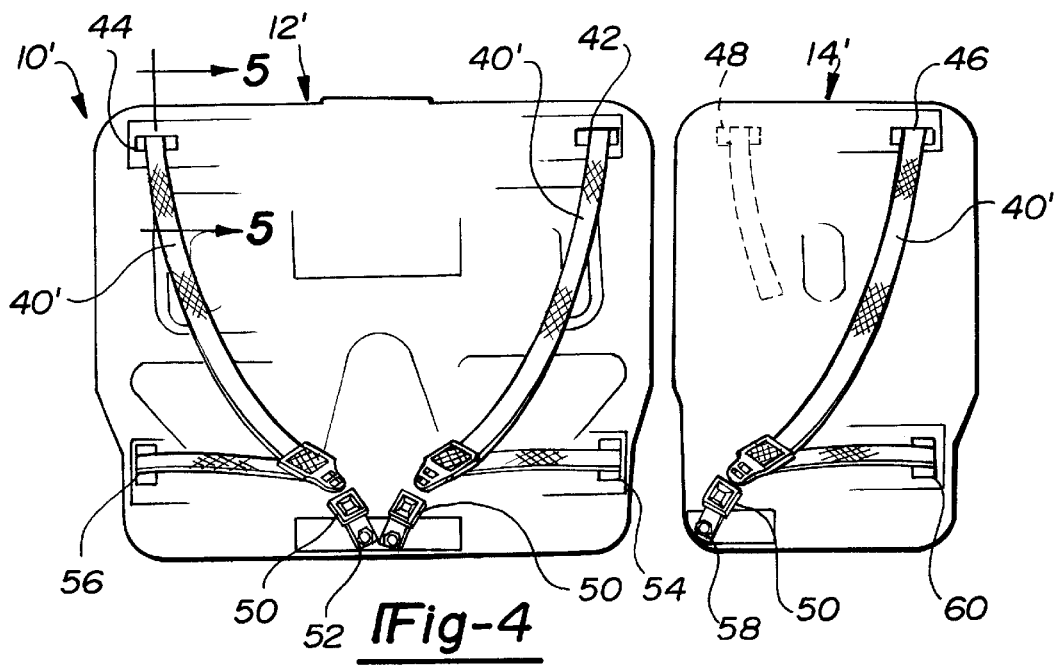
FIG. 4 is a front view of an alternative embodiment of the modular seat back system.
Figure 5:
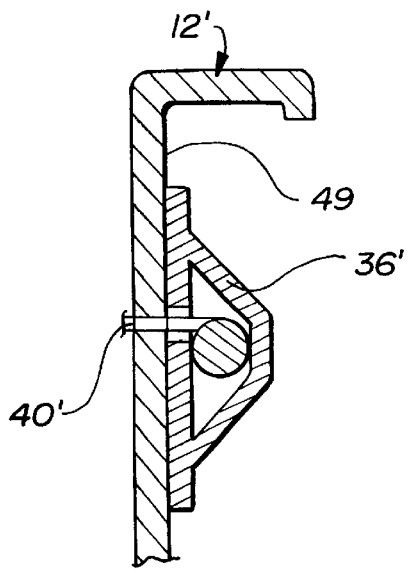
FIG. 5 is a cross-sectional view taken along the lines 5—5 in FIG. 4.

As shown in FIGS. 4 and 5, an ABTS version of the modular seat back system 10' includes a type-A seat back frame 12' and a type-B seat back frame 14'. The ABTS term, which is also known as "Integrated Structural Seat" or "ISS", refers to the fact that all of the seatbelt anchorages for a seating position are located within the seat back and seat cushion frames. The type-A seat back frame 12' includes two seatbelt retraction devices 36', one acting as a left shoulder seatbelt anchorage 42 and the other acting as a right shoulder seatbelt anchorage 44. The type-B seat back frame 14' includes a seatbelt retraction device 36' either acting as a left shoulder seatbelt anchorage 46 or acting as a right shoulder seatbelt anchorage 48 (shown in phantom). The seatbelt retraction devices 36' are shown as mounted on the rear surface 49 of the seat back frame 12' or 14' but could be mounted on the front surface as in the prior embodiment with equal result. Further, the prior embodiment could use rear mounted seatbelt retraction devices as well.

The seatbelt retraction devices 36' spool seatbelts or webbings 40' for convenient use or storage by the occupant of the vehicle. In the type-A seat back frame 12', the free end of the seatbelts 40' passes through a buckle 50 at central pelvic seatbelt anchorage 52 and attaches to the left and right pelvic seatbelt anchorages 54 and 56. In the type-B seat back frame 14', the free end of the seatbelt 40' passes through a buckle 50 at a right pelvic seatbelt anchorage 58 and attaches to a left pelvic seatbelt anchorage 60. The seatbelt retraction device 36' may also act as the right shoulder seatbelt anchorage 48, as previously noted and shown in phantom in FIG. 4. This dual-nature of the type-B seat back frame 14' promotes the modular features of the modular seat back system 10', as further explained below.

Figure 6:
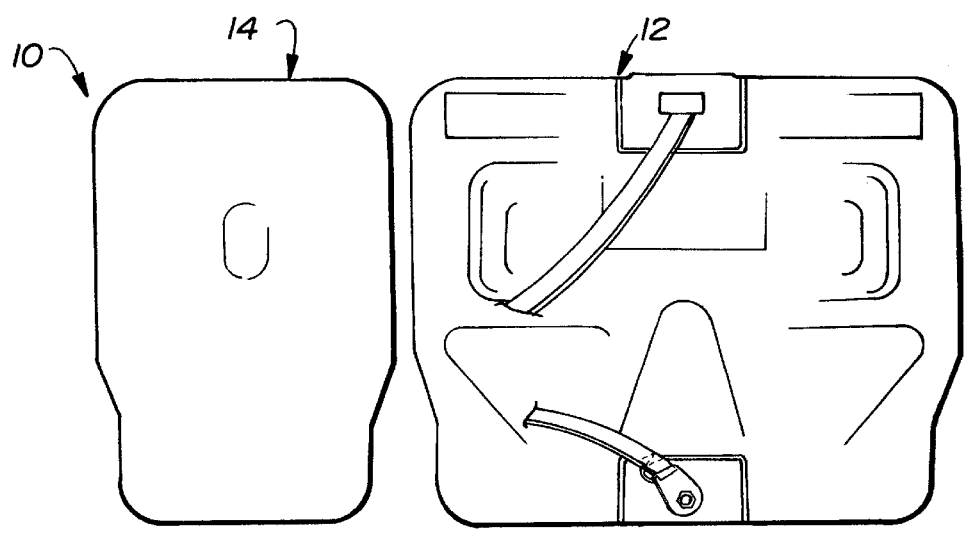
FIG. 6 is a front view of the modular seat back system in a "60/40 configuration"

The seat back frames 12 and 14 may be assembled in several different combinations. With the preferred embodiment of the present invention, the type-B seat back frame 14 may be placed on the left side of a vehicle and the type-A seat back frame 12 may be placed on the right side. The "left side" and the "right side" of the vehicle are both defined with a forward view from the interior of the vehicle. The figures are draw with a rearward view from the interior of the vehicle and, hence, the "left side" and the "right side" appear on the right side and the left side, respectively, of the figure. This particular arrangement forms the "40/60 configuration" as shown in FIG. 2. The "40/60 configuration" is particularly advantageous in small left-hand-drive vehicles with a fold-down rear seating system. With the "40/60 configuration", the "60" seat back frame may be folded into a stowed position to maximize available cargo space in the vehicle, while the "40" seat back frame, which might otherwise contact the drivers seat if it were folded, remains in an upright position. In a right-hand-drive version of the vehicle, a "60/40 configuration", as shown in FIG. 6, would be particularly advantageous. Because of the dual-nature of the seatbelt retraction device 36, the same type-A seat back frame 12 may be used with both the "40/60 configuration" and the "60/40 configuration."

Figure 7:
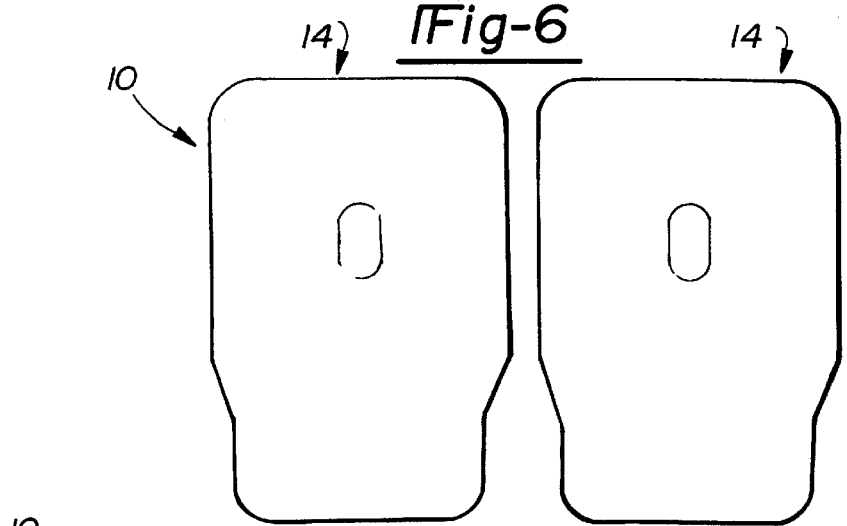
FIG. 7 is a front view of the modular seat back system in a "40/40 configuration"
Figure 8:
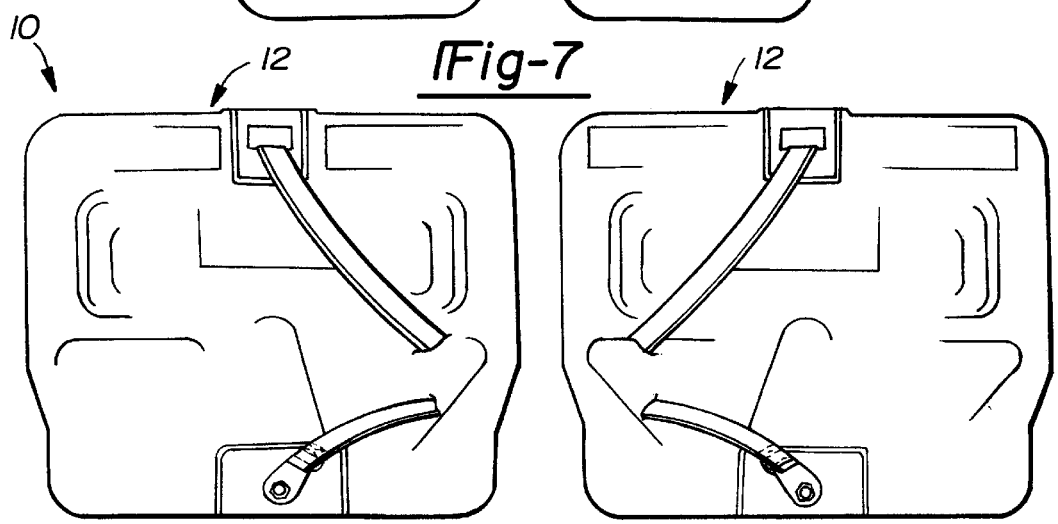
FIG. 8 is a front view of the modular seat back system in a "60/60 configuration"

In smaller vehicles, where the "40/60 configuration" is too wide, the vehicle may be equipped with two type-B seat back frames 14 in a "40/40 configuration", as shown in FIG. 7. Finally, in larger vehicles, where the "40/60 configuration" is too narrow, the vehicle may be equipped with two type-A seat back frames 12 in a "60/60 configuration", as shown in FIG. 8.

Figure 9:
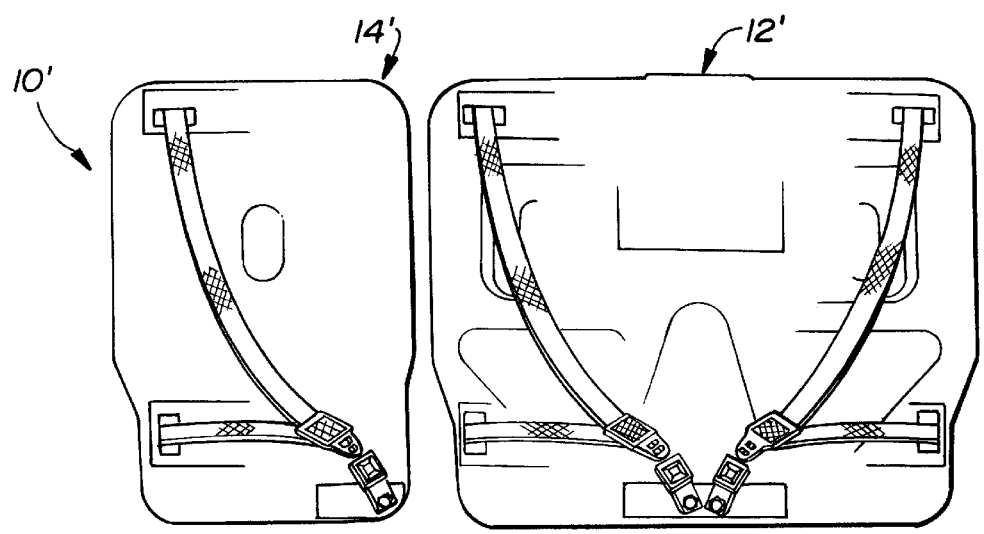
FIG. 9 is a front view of the alternative embodiment of the modular seat back system in a "60/40 configuration"

With the ABTS version of the modular seat back system 10', the type-B seat back frame 14' and the type-A seat back frame 12' may be placed in a vehicle to form a "40/60 configuration", as shown in FIG. 4. In right-hand-drive versions of the vehicle, the seat back frames 12' and 14' may be placed in a "60/40 configuration", as shown in FIG. 9. Because of its dual-nature, the same type-B seat back frame 14' may be used with both the "40/60 configuration" and the "60/40 configuration."

Figure 10:
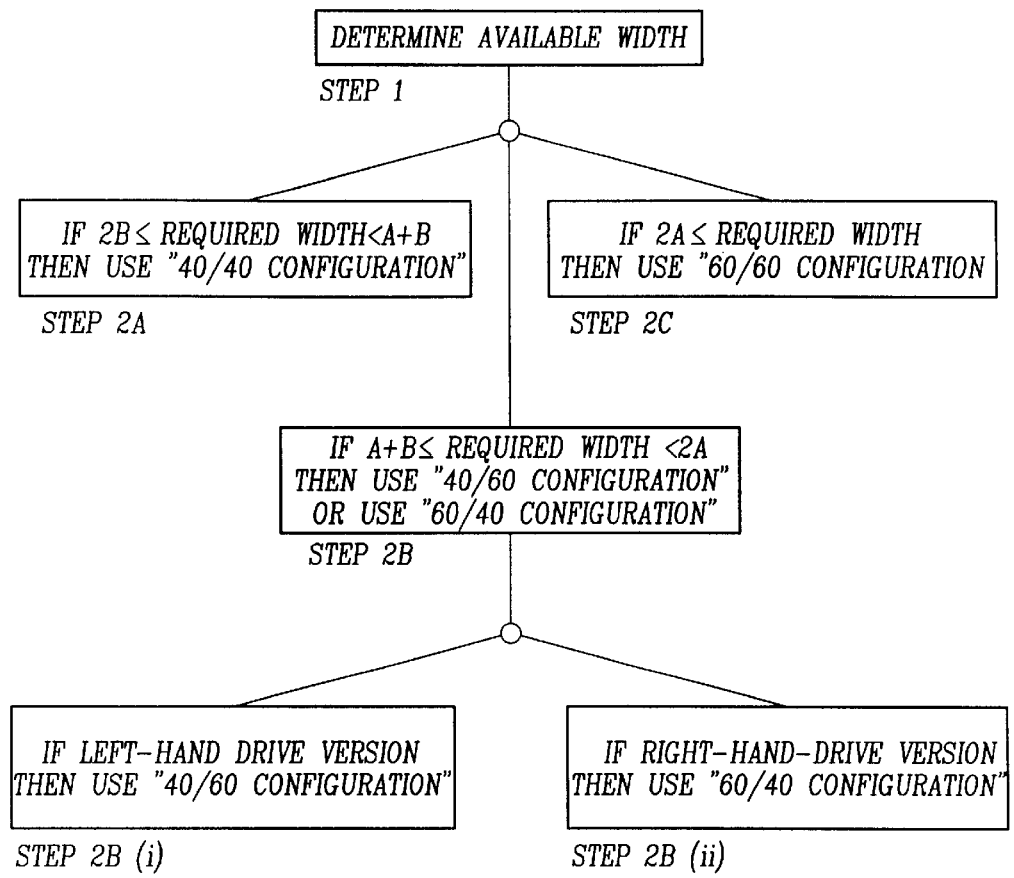
FIG. 10 is a schematic of the method of supplying modular seat back systems to different vehicle architectures, and to both left-hand-drive and right-hand-drive versions of a vehicle.

The selection method for these different combinations includes two major steps, with several sub-steps, as shown in FIG. 10. Step 1 includes determining the available width of the seating system for the vehicle. The available width may be limited by design factors such as the overall width of the vehicle and the track width of the rear axle.

Step 2 of the selection method includes selecting a seating system based on the available width. In smaller vehicles, a "40/40 configuration" with two type-B seat back frames 14 is preferably selected. Smaller vehicles are defined by an available width equal to or greater than twice width B (2×width B) yet less than a combination of width A and width B (width A+width B), as shown in Step 2A. In medium-sized vehicles, a "40/60 configuration" or a "60/40 configuration" with one type-A seat back frame 12 and one type-B seat back frame 14 is selected. Medium-sized vehicles are defined by an available width equal to or greater than the combination of width A and width B (width A+width B) and less than twice width A (2×width A), as shown in Step 2B. In larger vehicles, a "60/60 configuration" with two type-A seat back frames 12 is selected. Larger vehicles are defined by an available width equal to or greater than twice width A (2×width A), as shown in Step 2C.

In left-hand-drive versions of medium-sized vehicles, a "40/60 configuration" with a type-A seat back frame 12 on the right side of the vehicle and a type-B seat back frame 14 on the left side behind the driver is selected. In right-hand-drive versions of medium-sized vehicles, a "60/40 configuration" with a type-A seat back frame 12 on the left side of the vehicle and a type-B seat back frame 14 on the right side behind the driver is selected. These steps are substeps of Step 2B, as shown in Steps 2B(i) and Steps 2B(ii). Hence, the flexible design of the modular seat back system 10 coupled with the innovative methods of the present invention provide a modular seat back system 10 for different vehicle architecture with different available widths and for use in both the right-hand-drive and the left-hand-drive versions of a particular vehicle.

Typically, an automotive manufacturer will use at least three different vehicle lines or platforms within their fleet, for example, a smaller vehicle platform, a medium-sized vehicle platform, and a larger vehicle platform. An automotive manufacture may sell multiple models based upon each vehicle platform. Within each model, there may be several variations or styles of the model, for example, a couple, a convertible, a sedan, a station wagon, and a sport utility vehicle or cross-over vehicle. As related to the present invention, the term "vehicle architecture" means a particular style of a particular model on a particular platform. Thus different vehicle architectures would result from the use of different platforms, from the use of different models on a particular platform, or from the use of different styles of a particular model. At times, these different vehicle architectures have different available widths or require different seating systems, to which the present invention is directed.

Figure 11:
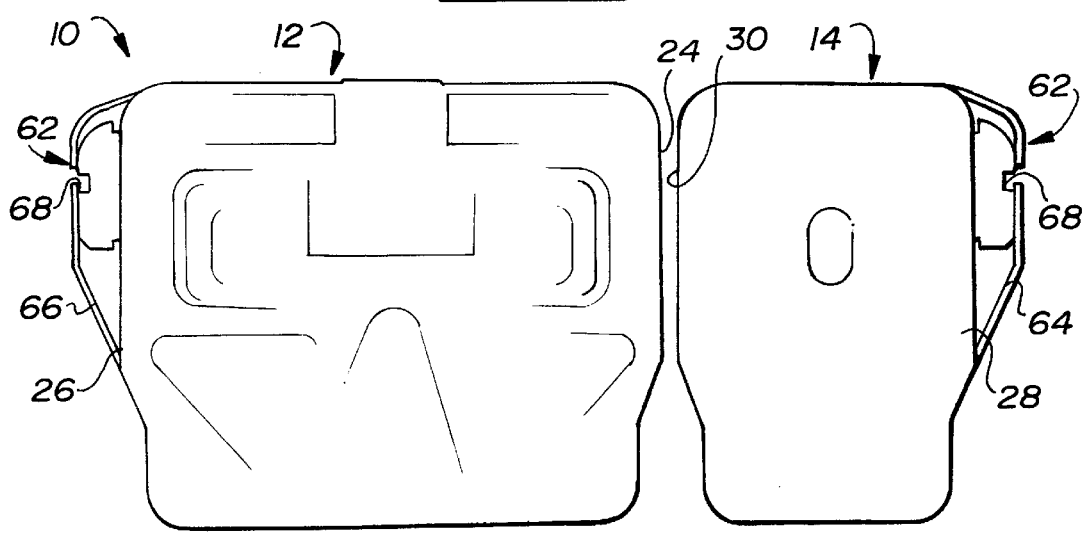
FIG. 11 is a front view of a further alternative embodiment of the modular seat back system.

As shown in FIG. 11, frame extenders 62 may be attached to the seat back frames 12 and 14 to extend the width of the modular seat back system 10. The frame extenders 62 are particularly useful when the available width of the vehicle is just short of the "40/60 configuration" or is just short of the "60/60 configuration." In these situations, the frame extenders 62 may be used on the "40/40 configuration" and on the "40/60 configuration", respectively, to extend the modular seat back system 10 to the available width.

The frame extenders 62 include a left seat back extender 64 and a right seat back extender 66. The left seat back extender 64 is adapted to attach to either the left edge 24 of the type-A seat back frame 12 or the left edge 28 of the type-B seat back frame 14. The right seat back extender 66 is adapted to attach to either the right edge 26 of the type-A seat back frame 12 or the right edge 30 of the type-B seat back frame 14. The attachment method may include fasteners including, but not limited to, nails, screws, bolts, rivets, interlocking tabs, welding, adhesives, or other electrical, chemical, or heat induced forms of attachment. Both frame extenders 62 include latch attachment points 68. When used with a corresponding latch (not shown) in the interior of a vehicle, the latch attachment points 68 may be engaged to secure the seat back frames 12 and 14 in an upright position and may be disengaged to fold the seat back frame into a storage position. Alternately, the seat back frames 12 and 14 can be structurally designed to coordinate with devices known in the art which are located at the pivot joint and do not require a latch and latch attachment combination.

The foregoing discussion discloses and describes preferred embodiments of the present invention. One skilled in the art will readily recognize from such discussion, and from the accompanying drawings and claims, that changes and modifications can be made to the invention without departing from the true spirit and fair scope of the invention as defined in the following claims.

What is claimed is:

1. A modular seat back system for a vehicle, comprising:
   a type-A seat back frame having a left edge, a right edge which is substantially symmetrically opposite said left edge, a center portion, and an upper portion, and having a center seatbelt anchorage in an intersection of said center portion and said upper portion; and
   a type-B seat back frame having a left edge, and a right edge which is substantially symmetrically opposite said left edge;
   wherein said left edge of said type-A seat back frame and said left edge of said type-B seat back frame are substantially similar in shape and size, and wherein said right edge of said type-A seat back frame and said right edge of said type-B seat back frame are substantially similar in shape and size.

2. The modular seat back system of claim 1, wherein said type-A seat back frame defines a width A from said left edge to said right edge in said upper portion of said type-A seat back frame, said type-B seat back frame defines a width B from said left edge to said right edge in said upper portion of said type-B seat back frame, and said width A is greater than said width B.

3. The modular seat back system of claim 2, wherein said width A is between 1.5 and 2.5 times greater than said width B.

4. The modular seat back system of claim 1, wherein said center seatbelt anchorage is a seatbelt retractor device.

5. The modular seat back system of claim 1, further comprising a left seat back extender adapted to connect to said left edge of one of said type-A and type-B seat back frames, and a right seat back extender adapted to connect to said right edge of the other of said type-A and type-B seat back frames.

6. The modular seat back system of claim 5, wherein at least one of said left and right seat back extenders includes latch attachments points to engage a latch on the vehicle.

7. A method of supplying a modular seat back system for different vehicle lines, comprising the steps of:
   (a) providing a series of type-A seat back frames, each type-A seat back frame defining a width A;
   (b) providing a series of type-B seat back frames, each type-B seat back frame defining a width B which is less than said width A;
   (c) on a first vehicle architecture, supplying a seating system having a type-A seat back frame and a type-B seat back frame; and
   (d) on a second vehicle architecture, supplying a seating system having a pair of type-B seat back frames.

8. The method of claim 7, wherein step (a) includes providing a series of type-A seat back frames, each type-A seat back frame defining a left edge, a right edge which is substantially symmetrically opposite said left edge, a center portion, and an upper portion, and having a center shoulder seatbelt anchorage in an intersection of said center portion and said upper portion, and wherein step (b) includes providing a series of type-B seat back frames, each type-B seat back frame defining a left edge and a right edge which is substantially symmetrically opposite said left edge, said left edge of said type-A seat back frame and said left edge of said type-B seat back frame being substantially similar in shape and size, and said right edge of said type-A seat back frame and said right edge of said type-B seat back frame being substantially similar in shape and size.

9. The method of claim 7, wherein step (a) includes providing a series of type-A seat back frames, each defining a left edge, a right edge, an upper portion, and a width A from said left edge to said right edge in said upper portion, and having a left shoulder seatbelt anchorage in said upper portion proximate said left edge, and a right shoulder seatbelt anchorage in said upper portion proximate said right edge, and wherein step (b) includes providing a series of type-B seat back frames, each defining a left edge, a right edge, an upper portion, and a width B from said left edge to said right edge in said upper portion, and having a shoulder seatbelt anchorage in said upper portion proximate one of said left edge and said right edge, said width A being greater than said width B.

10. The method of claim 9, wherein said left edge of said type-A seat back frames and said left edge of said type-B seat back frames are substantially similar in shape and size, and said right edge of said type-A seat back frames and said right edge of said type-B seat back frames are substantially similar in shape and size.

11. The method of claim 7, further comprising the steps:
(e) providing a series of left seat back extenders, each left seat back extender adapted to connect to a left edge of said type-A seat back frames and to a left edge of said type-B seat back frames; and
(f) providing a series of right seat back extenders, each right seat back extender adapted to connect to a right edge of said type-A seat back frames and to a right edge of said type-B seat back frames; and
(g) on a third vehicle architecture, supplying a seating system with one type-A seat back frame, one type-B seat back frame, one left seat back extender connected to one of said type-A and type-B seat back frames, and one right seat back extender connected to the other of said type-A and type-B seat back frames.

12. A method of supplying a modular seat back system for both left-hand-drive and right-hand-drive versions of a vehicle, comprising the steps of:
(a) providing a series of type-A seat back frames, each type-A seat back frame defining a width A;
(b) providing a series of type-B seat back frames, each type-B seat back frame defining a width B which is less than said width A;
(c) on the left-hand-drive version of the vehicle, supplying a seating system having a type-A seat back frame on the right side of the vehicle and a type-B seat back frame on the left side of the vehicle; and
(d) on the right-hand-drive version of the vehicle, supplying a seating system having a type-B seat back frame on the right side of the vehicle and a type-A seat back frame on the left side of the vehicle.

13. The method of claim 12, wherein step (a) includes providing a series of type-A seat back frames, each type-A seat back frame defining a left edge, a right edge which is substantially symmetrically opposite said left edge, a center portion, and an upper portion, and having a center shoulder seatbelt anchorage in an intersection of said center portion and said upper portion, and wherein step (b) includes providing a series of type-B seat back frames, each type-B seat back frame defining a left edge and a right edge which is substantially symmetrically opposite said left edge, said left edge of said type-A seat back frame and said left edge of said type-B seat back frame being substantially similar in shape and size, and said right edge of said type-A seat back frame and said right edge of said type-B seat back frame being substantially similar in shape and size.

14. The method of claim 12, wherein step (a) includes providing a series of type-A seat back frames, each defining a left edge, a right edge, an upper portion, and a width A from said left edge to said right edge in said upper portion, and having a left shoulder seatbelt anchorage in said upper portion proximate said left edge and a right shoulder seatbelt anchorage in said upper portion near said right edge and wherein step (b) includes providing a series of type-B seat back frames, each defining a left edge, a right edge, an upper portion, and a width B from said left edge to said right edge in said upper portion, and having a shoulder seatbelt anchorage in said upper portion proximate one of said left edge and said right edge, said width A being greater than width B.

15. The method of claim 12, further comprising the steps:
(e) providing a series of left seat back extenders, each left seat back extender adapted to connect to a left edge of said type-A seat back frames and to a left edge of said type-B seat back frames;
(f) providing a series of right seat back extenders, each right seat back extender adapted to connect to a light edge of said type-A seat back frames and to a right edge of said type-B seat back frames; and
(g) on a second vehicle architecture, supplying a seating system with one type-A seat back frame, one type-B seat back frame, one left seat back extender connected to one of said type-A and type-B seat back frames, and one right seat back extender connected to the other of said type-A and type-B seat back frames.

16. The method of claim 12, further comprising the step:
(e) on a second vehicle architecture, supplying a seating system with two type-B seat back frames.

17. The method of claim 16, further comprising the step:
(f) on a third vehicle architecture, supplying a seating system with two type-A seat back frames.

18. The method of claim 12, further comprising the step:
(e) on a second vehicle architecture, supplying a seating system with two type-A seat back frames.

19. A modular seat back system for a vehicle comprising;
a type-A seat back frame having a left edge, a right edge which is substantially symmetrically opposite said left edge, and an upper portion having at least one seatbelt anchorage; and
a type-B seat back frame having a left edge, and a right edge which is substantially symmetrically opposite said left edge;
wherein said left edge of said type-A seat back frame and said left edge of said type-B seat back frame are substantially similar in shape and size, and wherein said right edge of said type-A seat back frame and said right edge of said type-B seat back frame are substantially similar in shape and size.

* * * * *

UNITED STATES PATENT AND TRADEMARK OFFICE
CERTIFICATE OF CORRECTION

PATENT NO. : 6,260,924 B1
DATED : July 17, 2001
INVENTOR(S) : Jones et al.

It is certified that error appears in the above-identified patent and that said Letters Patent is hereby corrected as shown below:

Claim 15,
Line 29, delete "light" and insert -- right -- therefore.

Signed and Sealed this

Eleventh Day of December, 2001

Attest:

NICHOLAS P. GODICI
Attesting Officer
Acting Director of the United States Patent and Trademark Office